INVENTORS.
WILLIAM R. LASTINGER
NEWELL J. GARDNER
By Bernard Kriegel
ATTORNEY.

United States Patent Office 3,536,876
Patented Oct. 27, 1970

3,536,876
QUICK DISCONNECT BATTERY APPARATUS
William R. Lastinger, Austin, Tex. (P.O. Box 75366, Los Angeles, Calif. 90005), and Newell J. Gardner, 6505 Wilshire Blvd., Los Angeles, Calif. 90048
Filed Dec. 6, 1967, Ser. No. 688,456
Int. Cl. H01h 17/08; H01r 13/62
U.S. Cl. 200—161                    10 Claims

ABSTRACT OF THE DISCLOSURE

Apparatus insertable between an automobile, or similar, battery and a battery cable, and controlled from the dashboard, or other remote point, to pull a coupling pin normally holding two conductive members in telescoped contact with each other to permit a spring to separate the two members from one another, and thereby disrupt the electrically conductive path between the battery and cable. Although separated from each other, the members are retained in adjacency to enable them to be easily and conveniently purposely reengaged.

---

The present invention relates to connections between a battery and a battery cable, and more particularly to apparatus for effecting ready disconnection and reconnection between the battery and cable.

Apparatus has been proposed for disconnecting a conductor cable from a battery in the event of an emergency that might occur in an automobile, powered boat, and the like, to prevent ignition of fuel that might leak or spill from a broken fuel line, thereby causing a fire, or to prevent restarting of a fire following its being extinguished. Thus, the entire electrical system of the vehicle is completely deenergized, causing the engine to stop.

One such arrangement is disclosed in U.S. Pat. No. 3,042,891. However, the device disclosed therein requires substantial space; it has numerous parts, and is, therefore, relatively complex; it necessitates the use of a special cable connection; it imposes lateral strains on the mechanism in effecting disruption of the connection between the cable and the battery, which could result in inability to produce the desired disruption; and it involves the possibility of the electrical connection being reconstituted inadvertently, thereby again completing the electric circuit to different parts of the engine and the vehicle.

In accordance with the present invention, a quick disconnect battery apparatus is provided which is of a compact design and, therefore, occupies much less space. It contains many fewer parts than heretofore, rendering it much more economical to manufacture. No bending or other action is imparted on parts of the apparatus in effecting disconnection between the cable and the battery, so that assurance is had that disconnection will occur when required. Moreover, if desired, a standard battery cable and terminal clamp can be used, which avoids the necessity for providing special parts. Once the apparatus is placed in disconnected condition, it is assumed that the circuit will remain broken, but the conductive parts, although retained in separated relation with respect to each other, are still disposed in convenient adjacency so that the parts can be easily reconnected.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
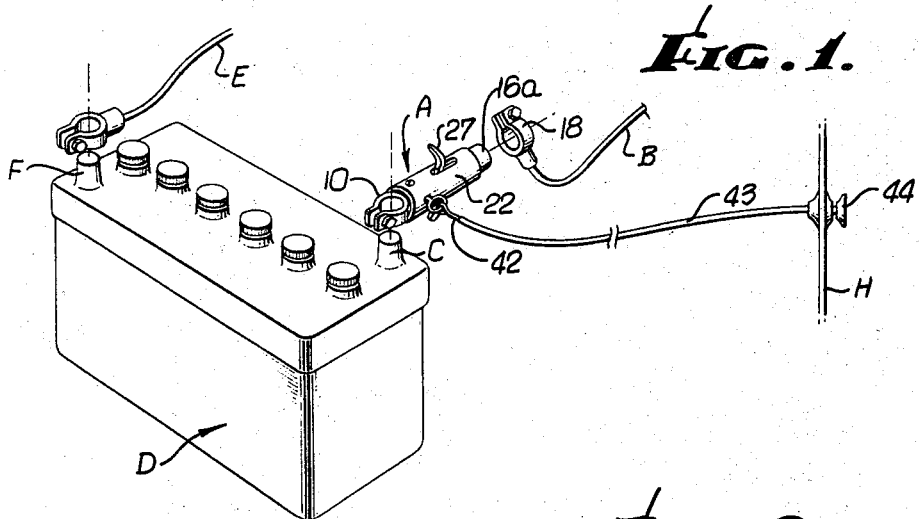
FIG. 1 is an exploded isometric view illustrating the quick disconnect battery apparatus in conjunction with a battery and the dash of an automobile.

As disclosed in the drawings, a quick disconnect apparatus A is interposed between a battery cable B of an automobile and one of the terminal posts, preferably the negative post C, of a battery D. The other battery cable E is connectible in the usual manner to the positive terminal post F of the battery. The battery cable B is normally connected to the negative terminal post C through the disconnect apparatus A, but can be electrically disconnected therefrom from a remote point, such as the dash H of an automobile, and by a person within the automobile. As is well known, the battery and associated parts of the battery are normally located under the hood of an automobile, or in the vicinity of an internal combustion engine. It is inconvenient and time consuming to disconnect a battery cable directly from the battery. By virtue of the present invention, such disconnection is readily effected from a remote location, such as, as indicated above, the interior of the vehicle.

The quick disconnect unit A includes a battery connector 10 having a terminal clamp 11 adapted to be clamped over the negative terminal post C of the battery through tightening of the usual bolt 12 extending through the wings 13 of the clamp. This connector has a cylindrical portion 14 merging into a reduced diameter portion 15 piloted within a conductive sleeve 16 that frictionally engages the periphery of the reduced diameter portion. Such engagement is assured by providing diametrically opposed longitudinal slits 17 in the sleeve opening through its end, so that the sleeve tends inherently to contract upon and grip the reduced diameter portion of the battery connector.

The usual terminal clamp 18 of the battery cable B is secured about the outer end 16a of the conductive sleeve by a bolt 19 extending through and engaging the opposed wings or ears 20 of the terminal clamp. Accordingly, current can flow from the battery cable b through its terminal clamp 18 to the conductive sleeve 16, and from the conductive sleeve through the battery connector 10 to the negative terminal post C of the battery D.

Surrounding the conductive sleeve 16 and the cylindrical portions 14, 15 of the battery connector is a housing 22 made of suitable insulating material, this housing extending from the terminal clamp 11 of the battery connector to the outer portion 16a of the conductive sleeve 16 when the parts are assembled, leaving the outer portion 16a of the conductive sleeve exposed for reception of the terminal clamp 18 of the battery cable B. The housing is secured to the battery connector 10 by a plurality of screws 23 extending through holes 24 in the housing and threaded into companion holes 25 in the battery connector. The housing is also provided with diametrically opposed longitudinal slots 26, axially spaced from the battery connector 10, and through which extend a reset cross-piece and spring seat 27, which is preferably made of insulation material, and which extends through radial holes 28 in the conductive sleeve 16, being suitably secured to the sleeve. This cross-piece serves as a seat for a helical compression spring 29 bearing thereagainst at one end, its opposite end bearing against a thrust member 30 of insulation material, such as a wood dowel, that bears agains the end of the reduced diameter portion 15 of the battery connector 10. The spring 29 tends to expand and acts through the crosspiece to shift the conductive sleeve 16 axially away from the battery connector 10, to remove the conductive sleeve 16 axially from, and to a spaced relation relative to, the reduced diameter portion 15 of the battery connector, the extent of separation being limited by engagement of the cross-piece 27 with the ends 31 of the housing slots 26 along which the cross-piece is slidable.

Figure 2:
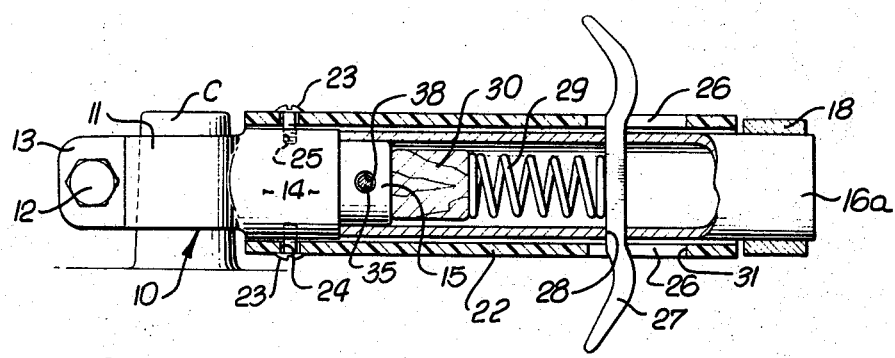
FIG. 2 is a longitudinal section through the apparatus with its parts in connected and assembled relation, some parts being shown in elevation.

The apparatus A is normally retained in a condition in which the conductive sleeve 16 surrounds and engages the reduced diameter portion 15 of the battery connector by a coupling pin 35 extending through aligned holes 36, 37, 38 provided in the housing 22, conductive sleeve 16, and reduced diameter portion 15 of the battery connector 10, respectively. This coupling pin 35 will retain the parts in the relative position illustrated in FIG. 2, in which the battery cable B is electrically connected with the negative terminal post C. The pin retains the spring 29 in its compressed condition, preventing its expansion and disconnection between the conductive sleeve 16 and the battery connector 10.

Figure 3:
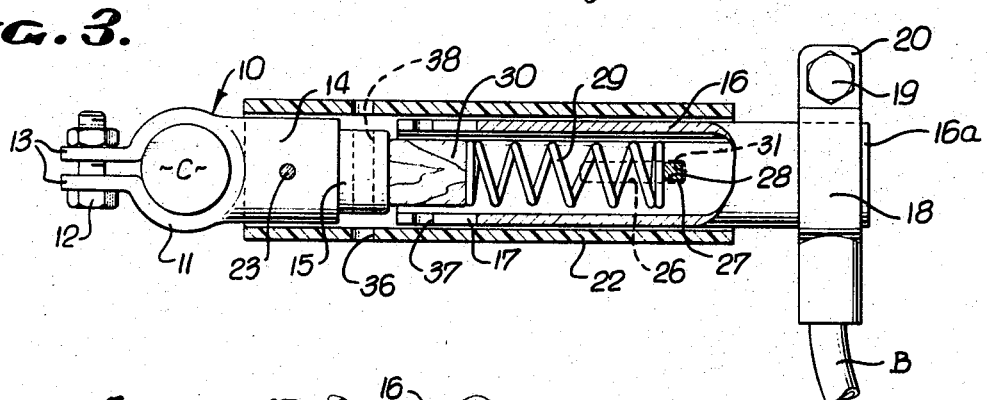
FIG. 3 is a view similar to FIG. 2, turned 90 degrees from FIG. 2, and illustrating the conductive parts of the apparatus disconnected from one another.
Figure 4:
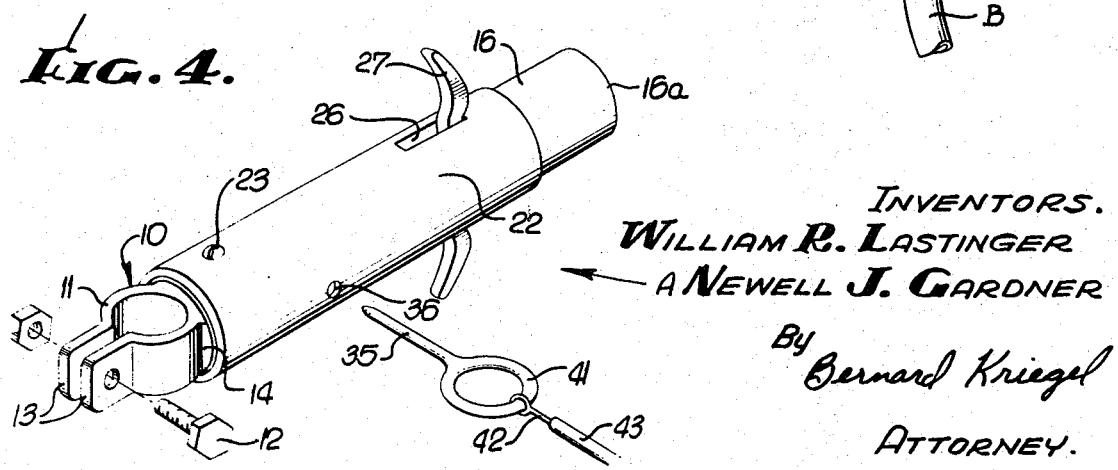
FIG. 4 is an isometric projection of the quick disconnect battery apparatus.

When the pin 35 is pulled from the holes 36, 37, 38, the spring 29 expands, shifting the sleeve 16 axially away from the battery connector 10, or to the disconnected position illustrated in FIG. 3, the extent of expansion of the spring being limited by engagement of the cross-piece 27 with the housing 22 at the outer ends 31 of the diametrically opposite slots 26. When in this condition, the spring retains the insulated thrust member 30 engaged with the end of the battery connector 10 and will retain the end 40 of the conductive sleeve 16 longitudinally spaced from the end of the reduced diameter portion 15 of the battery connector, the parts remaining in such condition.

As illustrated, the coupling pin 35 can be pulled from the holes 36, 37, 38 from the dash H of an automotive vehicle. As shown, the pin has an outer eye or loop 41 connected to a pull wire 42 that extends through a suitable elongate housing 43 running to the vehicle dash. The end of the pull wire 42 is connected to a knob 44 on the dash within the driver's compartment. At any time, the driver can pull the knob 44, the pull being transmitted through the pull wire 42 to the coupling pin 35, to pull it from the aligned holes 36, 37, 38, and thereby allow the compression spring 29 to shift the conductive sleeve 16 axially from engagement with the battery connector 10, and to the position illustrated in FIG. 3.

From the foregoing description, it is evident that in the event of a hazardous condition developing in the region of the engine, such as the breaking of a fuel line or a spark being produced by a live wire, or from another source, the electrical system can be completely deenergized, and very quickly, merely by pulling the coupling pin 35 from the holes 36, 37, 38. The pull wire 42 is preferably arranged in such manner that the pull is exerted axially of the coupling pin, enabling it to be easily removed to allow the helical spring 29 to expand, this spring having ample spring force to overcome the frictional engagement of the conductive sleeve 16 with the reduced diameter portion 15 of the battery connector 10.

With the apparatus in the disconnect condition, a disclosed in FIG. 3, it is to be noted that all of the parts remain in readily reassemblable relation with respect to one another. When reconnection between the conductive sleeve 16 and the reduced diameter portion 15 of the battery connector 10 is desired, it is only necessary to grasp the portions of the reset cross-piece 27 extending outwardly of the housing and shift the conductive sleeve back over the reduced diameter portion 15 of the battery connector againset the force of the spring 29, recompressing the latter, whereupon the coupling pin 35 is reinserted through the aligned holes 36, 37, 38 in order to retain the apparatus in its fully assembled and conductive condition, as disclosed in FIG. 2.

I claim:

1. In apparatus insertable between an electric battery cable and a battery terminal post: a battery connector member adapted to be secured to the battery post; a conductive member adapted to be connected to the battery cable; releasable means mechanically connecting said connector member and conductive member together for releasably coupling said conductive member to said connector member; spring means operable upon release of said releasable means for shifting said conductive member and connector member from said coupled relation to disengaged relation with respect to each other; and means for retaining said connector member and conductive member disengaged from and adjacent to each other.

2. In apparatus as defined in claim 1; wherein said conductive member comprises a conductive sleeve receiving said battery connector member.

3. In apparatus as defined in claim 1; wherein said conductive member comprises a conductive sleeve receiving said battery connector member; said shifting means comprising a spring seat secured to said sleeve, an insulator engaging said battery connector member, and a spring bearing against said insulator and spring seat.

4. In apparatus as defined in claim 1; wherein said retaining means comprises a housing encompassing said connector member and conductive member, means for securing said housing to one of said members, and coengageable means on said housing and the other of said members limiting movement of said members from each other.

5. In apparatus as defined in claim 1; wherein said retaining means comprises an insulated housing encompassing said connector member and conductive member, means for securing said housing to said connector member, said housing having a longitudinal slot, and means on said conductive member movable in said slot and engageable with said housing at an end of said slot to limit movement of said members from each other when shifted to disengaged relation.

6. In apparatus as defined in claim 1; wherein said conductive member comprises a conductive sleeve receiving said battery connector member; said retaining means comprising an insulated housing encompassing said connector member and conductive sleeve, means for securing said housing to said connector member, said housing having a longitudinal slot, and means on said conductive sleeve movable in said slot and engageable with said housing at an end of said slot to limit movement of said conductive sleeve and connector member from each other.

7. In apparatus as defined in claim 1; wherein said conductive member comprises a conductive sleeve receiving said gattery connector member; said retaining means comprising an insulated housing encompassing said connector member and conductive sleeve, means for securing said housing to said connector member, said housing having a longitudinal slot, spring seat means on said conductive sleeve movable in said slot and engageable with said housing at an end of said slot to limit movement of said conductive sleeve and connector member from each other; said shifting means comprising an insulator engaging said battery connector member, and a spring bearing against said insulator and spring seat means.

8. In apparatus insertable between a battery cable and a battery terminal post: a battery connector member adapted to be secured to the battery post; a conductive member adapted to be connected to the battery cable; releasable means mechanically connecting said connector member and conductive member together for releasably coupling said conductive member to said connector member; spring means operable upon release of said releasable means for shifting said conductive member and connector member from coupled relation to disengaged relation with respect to each other; an insulated housing encompassing said connector member and conductive member; means for securing said housing to one of said members; and coengageable means on said housing and the other of said members limiting movement of said members from each other when shifted to disengaged relation.

9. In apparatus as defined in claim 8; said shifting means comprising a spring seat secured to one of said members and shiftable in a longitudinal slot in said housing to limit movement of said members from each other, and spring means bearing against said spring seat and the other of said members.

10. In apparatus as defined in claim 8, wherein said conductive member comprises a conductive sleeve receiving said battery connector member; said housing, said sleeve and said connector member having aligned openings; and said releasable means comprises a pin releasably disposed in said openings.

References Cited

UNITED STATES PATENTS

| | | | |
|---|---|---|---|
| 2,208,721 | 7/1940 | Demosthenes | 200—161 X |
| 2,860,213 | 11/1958 | McNamara | 200—161 |
| 2,918,543 | 12/1959 | Vingin | 200—161 X |
| 2,563,335 | 8/1951 | Istrati et al. | 200—163 X |

FOREIGN PATENTS

| | | |
|---|---|---|
| 389,807 | 3/1922 | Germany. |
| 593,625 | 3/1959 | Italy. |

ROBERT K. SCHAEFER, Primary Examiner

R. A. VANDERHYE, Assistant Examiner

U.S. Cl. X.R.

339—46